United States Patent
Gnesda et al.

(10) Patent No.: US 6,970,721 B1
(45) Date of Patent: Nov. 29, 2005

(54) APPARATUS AND METHOD FOR MEASURING AND CONTROLLING THE PERFORMANCE OR AN ADJUSTABLE ANTENNA ON A SUB-SECTOR BASIS

(75) Inventors: Nicholas Gnesda, Aurora, IL (US); Kenneth Frank Smolik, Naperville, IL (US); Jeffrey Arthur Zahnle, Elburn, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/490,605

(22) Filed: Jan. 25, 2000

(51) Int. Cl.$^7$ .............................................. H04B 1/38
(52) U.S. Cl. ............................... 455/562.1; 455/67.11; 455/424
(58) Field of Search ..................... 455/562, 423, 455/424, 67.1, 67.3; 342/373

(56) References Cited

U.S. PATENT DOCUMENTS

| | | | |
|---|---|---|---|
| 5,095,500 A | 3/1992 | Tayloe et al. ................ 379/32 |
| 5,408,683 A * | 4/1995 | Ablay et al. ................ 455/33.1 |
| 5,596,333 A | 1/1997 | Bruckert ..................... 342/457 |
| 5,884,147 A | 3/1999 | Reudink et al. ........... 455/67.1 |
| 5,889,494 A | 3/1999 | Reudink et al. ............ 342/373 |
| 6,112,056 A * | 8/2000 | Langston .................... 455/62 |

OTHER PUBLICATIONS

R. C. Hansen, *Phased Array Antennas*, John Wiley & Sons, Inc., 1998, pp. 47-105.

A. W. Rudge et al., *The Handbook Of Antenna Design*, Peter Peregrinus Ltd., 1986, pp. 695-834.

* cited by examiner

Primary Examiner—Lee Nguyen

(57) ABSTRACT

The present invention retunes adjustable base station antennas of a wireless communications system in order to improve performance metrics that are determined by measurements and that are associated with sub-sectors within the wireless communications system. The present invention calculates and applies control signals to the adjustable antennas to improve the performance in accordance with the performance metrics. Thus, the present invention obviates much of the labor that is required for retuning the wireless communications system with changing radio conditions.

16 Claims, 6 Drawing Sheets

APPARATUS AND METHOD FOR MEASURING AND CONTROLLING THE PERFORMANCE OR AN ADJUSTABLE ANTENNA ON A SUB-SECTOR BASIS

TECHNICAL FIELD

This invention relates to a wireless communications system that monitors and adjusts a base station antenna's signal broadcast radiation pattern in order to improve its performance.

BACKGROUND OF THE INVENTION

A wireless communications system is engineered to serve a desired level of traffic according to radio transmission characteristics that are assumed to provide homogeneous signal strength coverage over a defined geographic area and are assumed to be time invariant. However, radio conditions between mobile subscriber units and serving base stations change with time, which degrades the performance of the wireless communications system (possibly substantially). Degradation of the wireless communications system's performance can be manifested in a number of ways. Examples include an increased dropped call rate and an increased frame error rate. The wireless communications system may require periodic "retuning" of base station antennas in order to maintain the engineered performance objectives. Each retuning of a base station may require that a technician physically travel to a base station's location. The effort associated with retuning is amplified by the number of base stations (which may be in the hundreds) associated with the wireless communications system. Thus, the task of retuning the wireless communications system is labor-intensive, time-consuming and expensive.

Additionally, radio characteristics are usually not homogeneous within a serving area of a base station antenna. Within the serving area, factors such as buildings, foliage, terrain and weather are not homogeneous, causing radio characteristics not to be homogeneous. Moreover, these factors may change with time, e.g. new buildings are constructed within the service area and the leaves of trees grow and fall with the seasons of the year. These phenomena cause "holes" in the radio coverage area. Increasing the signal strength in the direction of the hole can compensate for the deficiency.

With the prior art, "drive tests" are periodically conducted in order to detect holes in radio frequency (RF) coverage. Drive tests require that technicians operate mobile subscriber units while traversing routes and collecting measurements within the coverage area of the wireless communications system. The measurements are typically stored on a recording medium attached to the mobile subscriber unit. The measurements are subsequently analyzed to evaluate the RF coverage as provided by the wireless communications system.

A base station serves a region called a cell, which is further partitioned into sectors. The base station serves multiple sectors of a cell with each sector corresponding to a base station antenna. Because RF characteristics may not be homogeneous within a sub-region (sub-sector) of a sector, each base station antenna (sector) may require adjustments that are dependent upon a subregion of the given sector. Periodic retuning (that is typical with the prior art) must therefore account for the heterogeneous nature of RF characteristics. Thus, the wireless industry has a definite and urgent need for an invention that allows a wireless service provider to automatically retune the base station antennas within the wireless communications system in order to provide better service at a lower cost.

SUMMARY OF THE INVENTION

The present invention enables a service provider of a wireless communications system to measure and retune the radiation patterns of base station antennas without labor-intensive effort that is typical with the prior art. The present invention includes both apparatus and methods in which measurements are collected and in which performance metrics are derived from the measurements and analyzed so that an adjustable base station antenna can be controlled. Examples of adjustable base station antennas include linear array antennas and narrow beam antenna configurations as disclosed in the exemplary embodiment. The performance metrics are derived from measurements that are associated with subregions (sub-sectors) within the sector of the serving base station antenna. In order to accomplish this association, an approximate location of a mobile subscriber unit is determined at the time of a measurement. Control signals that are applied to adjustable base station antennas are calculated so that the performance metrics of the sub-sector are improved within the constraints limiting the degradation of performance metrics of other subsectors.

Numerous other advantages and features of the present invention will become readily apparent from the detailed description of the invention and the embodiments thereof, from the claims, and from the accompanying drawings.

DETAILED DESCRIPTION

Figure 1:
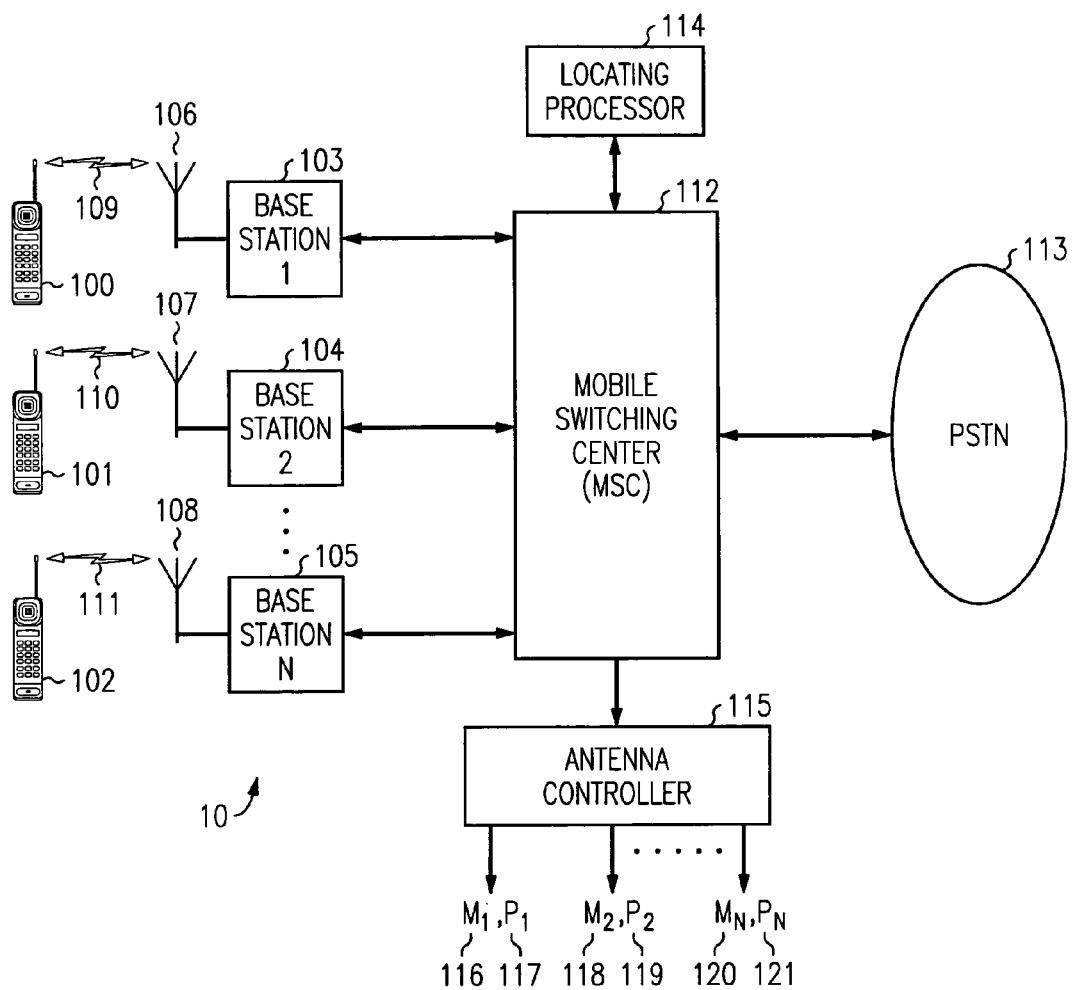
FIG. 1 illustrates an architecture of a wireless communications system.

FIG. 1 illustrates the architecture of a wireless communications system 10 serving mobile subscriber units 100, 101, and 102 by base stations 103, 104, and 105 through base station antennas 106, 107, and 108 utilizing radio channels 109, 110, and 111, respectively. Of course, a wireless communications system such as 10 may serve many thousands of mobile subscriber units; however, this fact does not affect the intrinsic nature of the invention disclosed herein. Base stations 103, 104, and 105 serve mobile subscriber units located within the corresponding cell associated with the coverage area. Base stations 103, 104, and 105 are connected to mobile switching center (MSC) 112, which is connected to public switching telephone network (PSTN) 113, locating processor 114, and antenna controller 115. PSTN 113 allows MSC 112 to establish incoming and outgoing calls with mobile subscriber units 100, 101, and 102. Locating processor 114, in response to commands from MSC 112, provides information about the location of mobile subscriber units 100, 101, and 102.

Locating processor 114 and antenna controller 115 may be physically separated from MSC 112, physically situated within MSC 112, or physically distributed throughout wireless communications system 10. In the exemplary embodiment of the present invention, locating processor 114 and antenna controller 115 are both distributed within wireless communications system 10. In the exemplary embodiment, location processor 114 is the same as or similar to the one described in U.S. Pat. No. 5,963,866, issued to Palamara, et al., and assigned to Lucent Technologies, Inc. Location processor 114 determines the location of a mobile subscriber unit by transmitting an audit signal, receiving a confirmation signal, time stamping the confirmation signal, and processing information from time stamping. The present invention allows for other approaches in order to locate a mobile subscriber unit. One alternative is for MSC 112 to request a position determining entity (PDE) for location information of a mobile subscriber unit (such as mobile subscriber unit 100, 101, or 102). The PDE determines the precise position or geographic location of a wireless subscriber unit when the wireless subscriber unit starts a call or while the mobile subscriber unit is engaged in a call. (Telecommunications Industry Association TR-45, PN-3890, *Enhanced Wireless 9-1-1 Phase 2*.)

Figure 5:
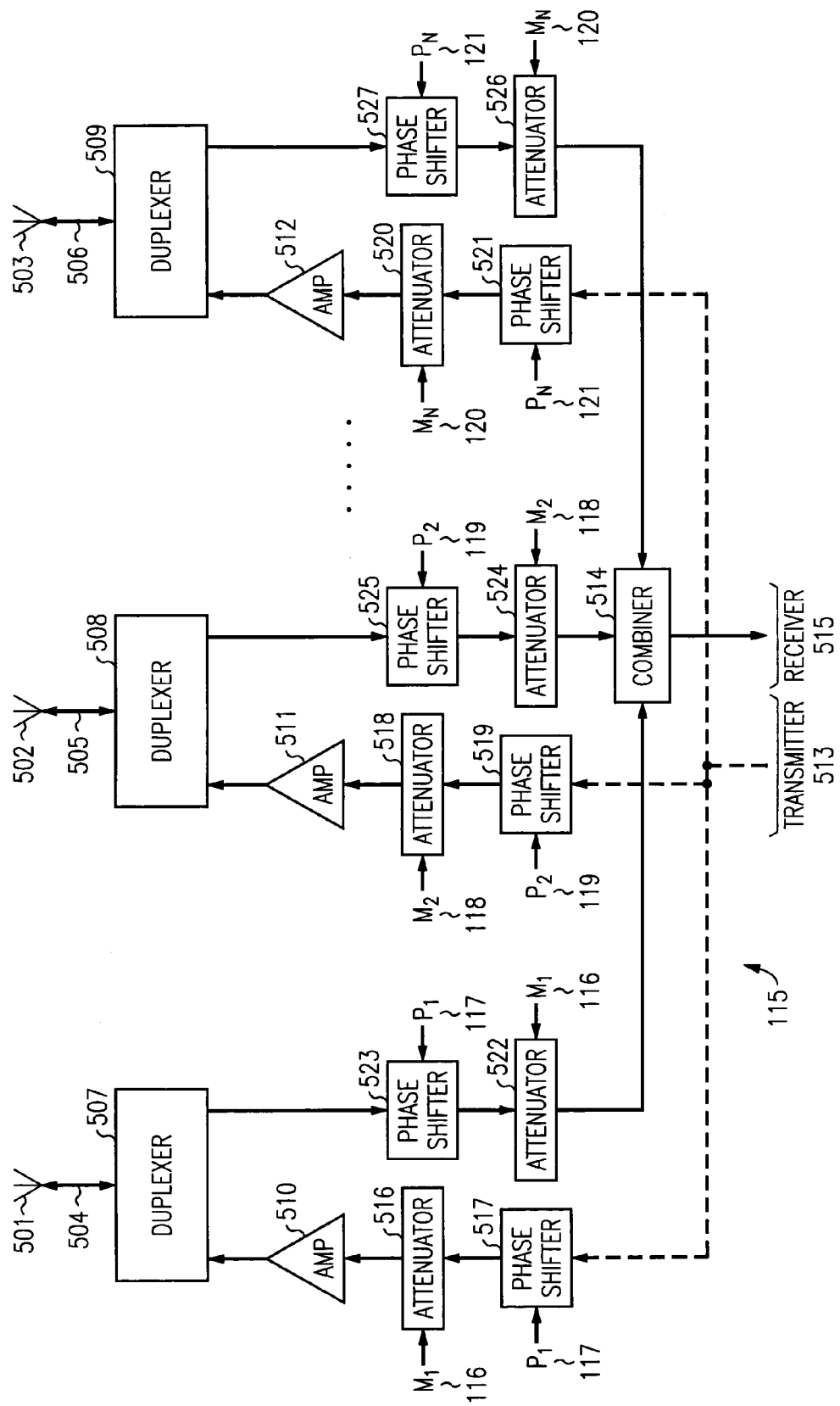
FIG. 5 illustrates apparatus controlling an adjustable base station antenna serving a sector of a cell.

Antenna controller 115 causes the adjustment of base station antennas 106, 107, and 108 by applying control signals 116 and 117, 118 and 119, and 120 and 121, respectively. Control signals 116, 117, 118, 119, 120, and 121 are coupled to attenuators 516 and 522, phase shifters 517 and 523, attenuators 518 and 524, phase shifters 519 and 525, attenuators 520 and 526, and phase shifters 521 and 527 as shown in FIG. 5.

Figure 2:
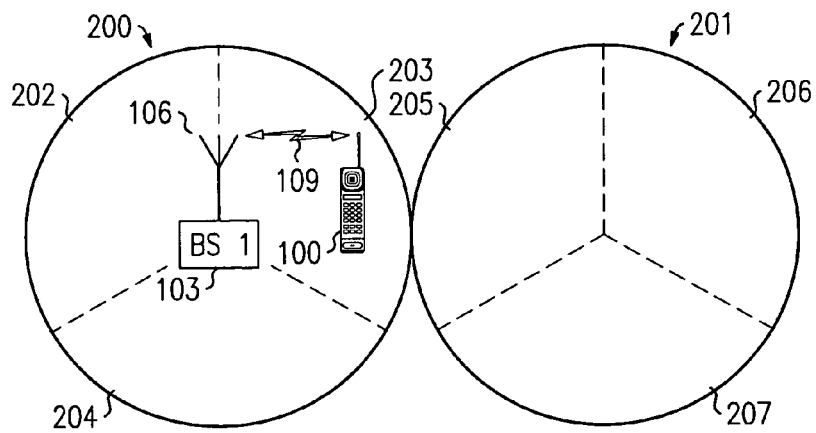
FIG. 2 illustrates partitioning the coverage of two essentially abutting cells with each cell served by a base station as shown in FIG. 1.

FIG. 2 illustrates two essentially abutting cells 200 and 201. Each cell is served by a base station such as base stations 103, 104, or 105. The coverage area of cell 200 is partitioned into sectors 202, 203, and 204; the coverage area of cell 201 is partitioned into sectors 205, 206, and 207. In the disclosed exemplary embodiment, each sector covers an angular width of approximately 120 degrees; however, the present invention supports angular widths having different values. Each sector is associated with an antenna such as base station antennas 106, 107, or 108.

Figure 3:
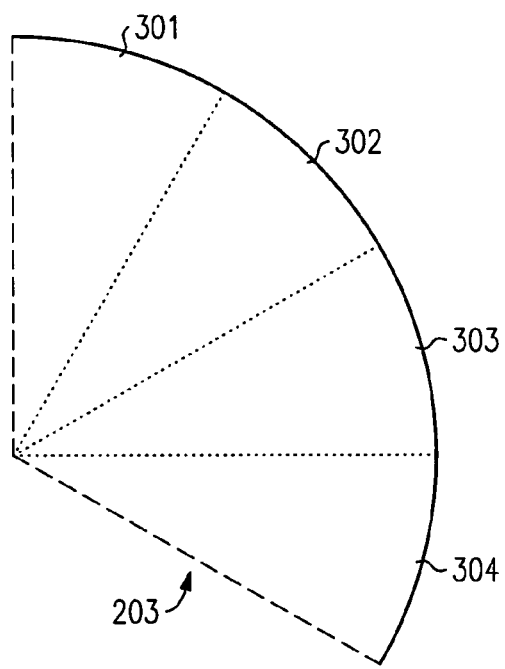
FIG. 3 shows further partitioning of a cell's sector into sub-sectors in which the sector is served through the base station antenna shown in FIG. 1.

FIG. 3 shows further partitioning sector 203 into sub-sectors 301, 302, 303, and 304. In the disclosed exemplary embodiment of the present invention, the angular coverage of each sub-sector is approximately 30 degrees. However, embodiments of the present invention are not limited to this angular value. A base station antenna (such as base station antenna 106, 107, or 108) serves an entire sector (such as sector 203). The radiation pattern of the associated antenna is controlled by adjusting the antenna characteristics of each sub-sector. In a first antenna configuration of the present invention, the base station antenna associated with sector 203 is a linear array antenna. A linear array antenna comprises at least one antenna element. For each antenna element, the control signals are adjusted both in amplitude and in phase. Linear array antennas are known to one skilled in the art and are discussed in detail by a number of references. (Hansen, R. C., *Phased Array Antennas*, John Wiley and Sons, Inc., 1998, pp. 47–105; Rudge, A. W., et al., *The Handbook of Antenna Design*, Peter Peregrinus Ltd., 1986, pp. 695–834.)

Figure 4:
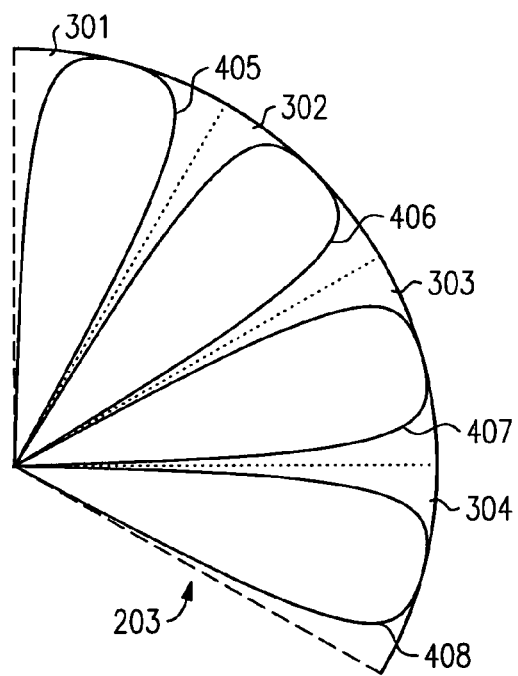
FIG. 4 illustrates a coverage of a base station antenna configured with a narrow beam signal broadcast radiation pattern for each sub-sector.

FIG. 4 shows a second antenna configuration of the present invention. The base station antenna associated with sector 203 is an array of antenna elements, each antenna element providing coverage for a sub-sector and each antenna element having a narrow beam radiation pattern. Narrow beam radiation patterns 405, 406, 407, and 408 correspond to sub-sectors 301, 302, 303, and 304, respectively. Antenna controller 115 individually adjusts each narrow beam radiation pattern 405, 406, 407, and 408.

FIG. 5 shows the apparatus comprising antenna controller 115, which is applicable to both the first and the second antenna configurations of the present invention. A base station antenna, which is associated with a sector, comprises antenna elements 501, 502, and 503. Antenna elements 501, 502, and 503 are connected to duplexers 507, 508, and 509 through coaxial cables 504, 505, and 506, respectively. Duplexers 507, 508, and 509 enable antenna elements 501, 502, and 503 to support both transmitted signals and received signals.

The transmitted signal to antenna element 501 is coupled to transmitter 513 through phase shifter 517, attenuator 516, and amplifier 510; the transmitted signal to antenna element 502 is coupled to transmitter 513 through phase shifter 519, attenuator 518, and amplifier 511. The signal transmitted to antenna element 503 is coupled to transmitter 513 through phase shifter 521, attenuator 520, and amplifier 512.

The signal received from antenna element 501 is coupled to receiver 515 through phase shifter 523, attenuator 522, and combiner 514; the received signal from antenna element 502 is coupled to receiver 515 through phase shifter 525, attenuator 524, and combiner 514; and the received signal from antenna element 503 is coupled to receiver 515 through phase shifter 527, attenuator 526, and combiner 514. Combiner 514 sums the received signals from antenna elements 501, 502, and 503. In the first antenna configuration of the present invention, three antenna elements are shown, although linear array antennas may utilize a different number of antenna elements in other antenna configurations. In the discussion herein, N antenna elements are implied.

Phase shifters 517, 519, 521, 523, 525, and 527 and attenuators 516, 518, 520, 522, 524, and 526 are controlled by antenna controller 115. The value of a control signal that is applied to each phase shifter and attenuator is determined by antenna controller 115 and coupled to the associated device. Thus, in FIG. 1, antenna controller determines the values $M_1$, $P_1$, $M_2$, $P_2$, $M_N$, and $P_N$, corresponding to control signals 116, 117, 118, 119, 120, and 121, respectively, and coupled to attenuators 516 and 522, phase shifters 517 and 523, attenuators 518 and 524, phase shifters 519 and 525, attenuators 520 and 526, and phases shifter 521 and 527, respectively.

With the second antenna configuration, each antenna element has a narrow beam radiation pattern, corresponding to a specific angular region of the associated sector (i.e. sub-sector). Consequently, phase shifters 517, 519, 521, 523, 525, and 527 are not required because phase adjustment is not necessary. Equivalently, phase shifters 517, 519, 521, 523, 525, and 527 can induce equal values of phase shift.

In the exemplary embodiment of the present invention, the control signal values of a given antenna element associated with the transmit path are the same as with the receive path. However, since the frequency of the transmitted signal is usually different from the frequency of the received signal, the radio characteristics of the receive path and the transmit path are different. If the differences are substantial, it may be necessary that the control signal values associated with the transmit path and the receive path be different. The present invention supports such cases.

With a uniform spaced linear antenna array for isotropic antenna elements (in which the radiation pattern is uniform in all directions), the radiation pattern is determined by F(theta)=sum from i=1 to N {A.sub.i*exp(j*2*pi*(i-1)*d/lambda*sin(theta)} (1), where F is a value representing the amplitude and phase of the radiation pattern, theta is the angle of observation with respect to broadside, N is the number of antenna elements, i corresponds to the ith antenna element, A is the coefficient associated with the ith antenna element, lambda is the wavelength of RF operation, d is the spacing between antenna elements, and pi is approximately 3.14159. (Rudge, A. W., et al., *The Handbook of Antenna Design*, Peter Peregrinus Ltd., 1986, pp. 699–697.) The control signal value M.sub.i of the ith attenuator is determined from the magnitude of A.sub.i and the control signal value of the ith phase shifter is determined from the phase of A.sub.i.

Equation 1 can be extended to cases in which the antenna elements are not isotropic (as characterized by any directional antenna such as a dipole antenna) by multiplying the radiation pattern determined in Equation 1 by the radiation pattern of a directional antenna element, assuming that all antenna elements of the linear array antenna are the same. This assumption simplifies the solution to Equation 1 because spatial periodicity is introduced. Because the magnitude and not the phase of the received signal is important, only the absolute value of F(theta) in Equation 1 needs to be determined. Both the variables N and d are known from a given antenna array. The absolute values of F(theta) are precalculated for different values of A.sub.i from which a lookup table is formed. If measurements indicate that signal strength in a given direction, i.e. absolute value of F(theta) needs to modified, values of A.sub.i can be retrieved from the lookup table that corresponds to the change in F(theta). However, one skilled in the art appreciates the fact that basic principles of electromagnetics must be observed. For example, if the total radiated power (integrated over all values of theta) is constant, then if the absolute value of F(theta) is increased in one direction, then the absolute value of F(theta) must be decreased in some other directions.

In the exemplary embodiment disclosed herein, the control signal values of each antenna element apply to all calls being served by a given sector at a given time. (Even though FIG. 1 shows one mobile subscriber unit being served by a base station, e.g. mobile subscriber unit 100 served by base station 103, a plurality of mobile subscriber units are typically served by a given sector.) In other words, control signal values are not determined for each specific call as may be the case for "smart antennas." The present determines the resulting updated control signal values for the given sector. These updated control signal values are used until the control values are recalculated during a subsequent study period. With the present invention, measurements include accumulated peg counts determined by call processing (service measurements and call processing failures).

Service measurements are typically counts associated with normal call processing including frame error rates on the forward radio channel (downlink) and the reverse radio channel (uplink), calls blocked on either the forward or reverse radio channel, and handoff failures. Call processing failures are additional counts that are generated for specific calls that cannot be sustained such as a dropped call. Measurements generated by either source are accumulated over the study period (e.g. one-hour).

Figure 6:
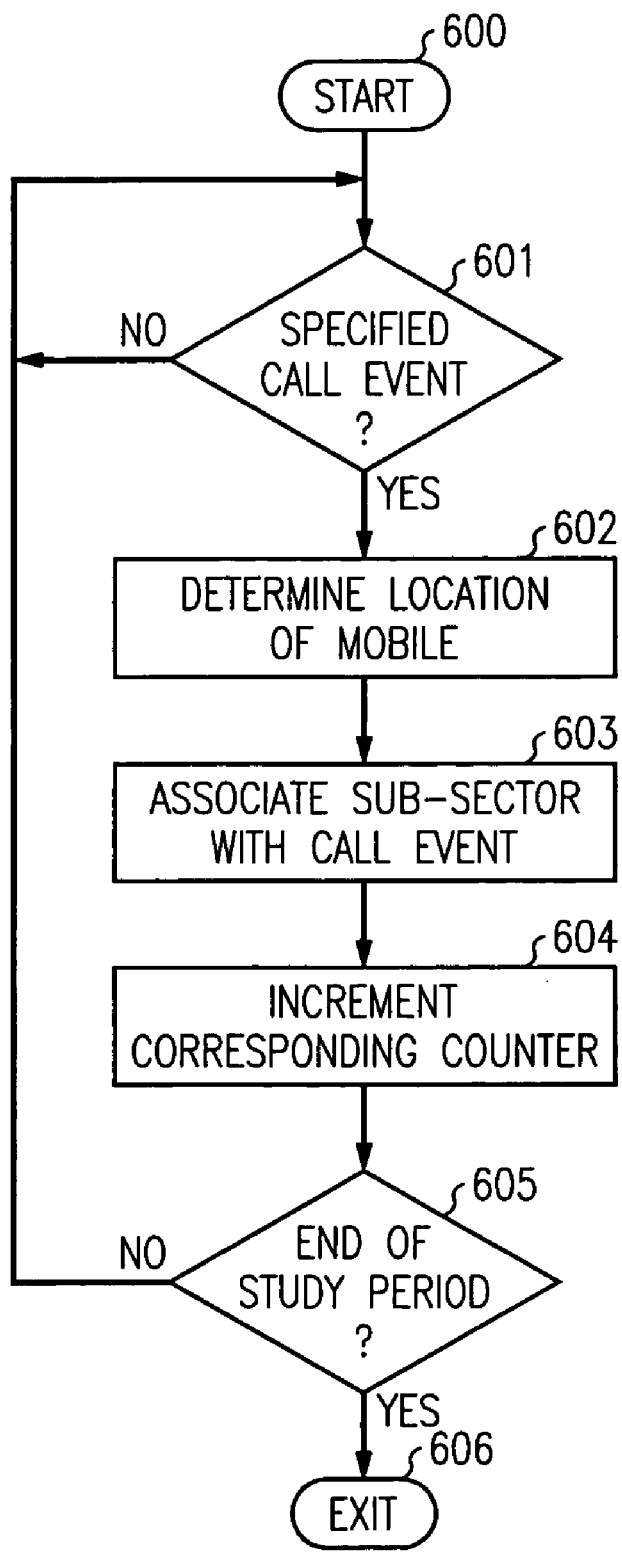
FIG. 6 shows a flow diagram operative in the apparatus of FIG. 5 for collecting measurements that are associated with each sub-sector.

FIG. 6 illustrates a call flow in which measurements are accumulated and grouped with respect to sub-sector for each of the disclosed exemplary embodiment. Step 600 activates the process at the beginning of the study period. In step 601 if a specific call event (e.g. a dropped call, blocked call, excessive forward frame error rate, or excessive reverse frame error rate) is detected, MSC 112 requests that locating processor 114 determine the location of mobile subscriber unit 100, 101, or 102 in step 602. If locating processor 114 cannot determine the location of the mobile subscriber unit, MSC 112 uses a last determined location of the mobile subscriber unit 100, 101, or 102. MSC 112 uses the location information obtained in step 602 to associate and accumulate the measurement obtained in step 601 with a specific sub-sector. The corresponding counter is incremented in step 604. This process is continued over the entire study period for all call events. Step 605 determines if the study period is complete. If not, step 601 is repeated; otherwise, step 606 exits the routine (i.e. the study period has ended). The routine in FIG. 6 provides a collection of counters representing performance metrics associated with each of the sub-sectors.

Figure 7:
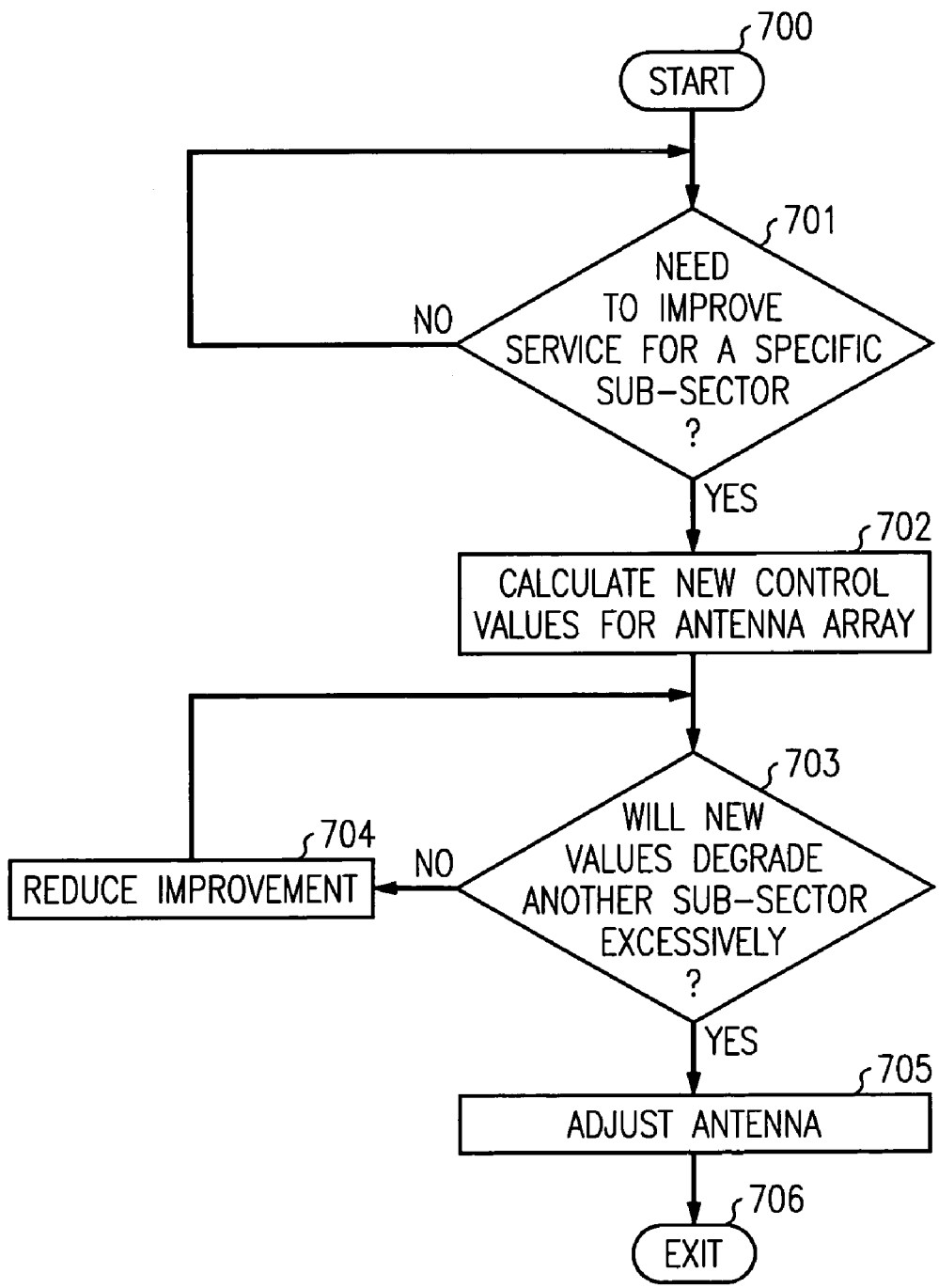
FIG. 7 shows a flow diagram for analyzing measurements for each sub-sector and for controlling an adjustable base station antenna of a sector.

FIG. 7 shows a flow diagram (which may be used by either of the antenna configurations) for analyzing the measurements that are collected by the process shown in FIG. 6. The process starts in step 700. In step 701, it is determined if a first performance metric of a specific sub-sector, as calculated from the counters from the process of FIG. 6, requires an improvement. As an example, dropped calls can be collected for each sub-sector in the process of FIG. 6. These measurements can be normalized by the number of calls associated with the given sub-sector to provide a dropped call rate performance metric. If the dropped call rate performance metric is above a threshold (i.e. there are too many dropped calls), as predetermined by the service provider, step 701 indicates that the first performance metric associated with the given sub-sector requires an improvement. In step 702, updated control values associated with the sub-sectors of the associated sector are determined (e.g. the dropped call rate needs to be reduced). Step 702 must operate within practical constraints of the wireless communications system. For example, if a sub-sector requires an increase of power to improve the first performance metric and if the total power of the associated sector is constant, then power must be allocated from the other sub-sectors and reallocated to the given sub-sector. As another example, increasing the power for one sub-sector may increase the interference to another sub-sector associated with another sector of the base station or of a neighboring base station. Consequently, a second performance metric associated with another sub-sector may be degraded. Step 703 determines if the degradation is within a threshold set by the service provider. If this is the case, step 704 reduces the improvement of the first performance metric. The base station antenna is adjusted in step 705 by applying control signals 116, 117, 118, 119, 120, and 121 to the apparatus shown in FIG. 5 and the routine is exited in step 706.

Figure 8:
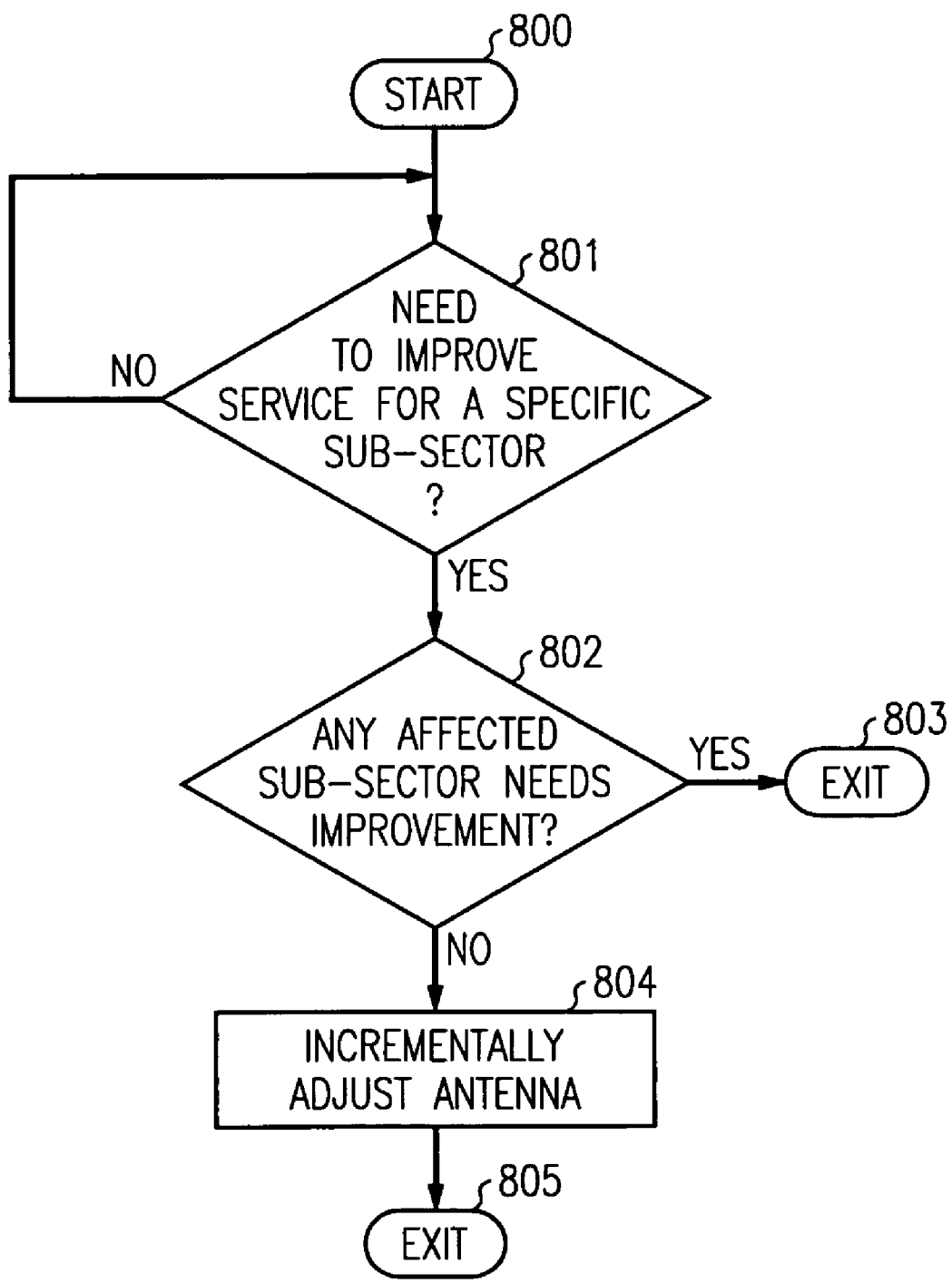
FIG. 8 shows a flow diagram for analyzing measurements for each sub-sector and for incrementally controlling and adjusting an adjustable base station antenna associated with a sector.

FIG. 8 shows an alternative flow diagram for analyzing the measurements collected by the process shown in FIG. 6. Either of the antenna configurations may use the process shown in FIG. 8 in lieu of the process shown in FIG. 7 As in FIG. 7, performance metrics are analyzed for each sub-sector; however, the base station antenna is controlled in an incremental manner. Step 800 initiates the process. As in step 701, step 801 determines if a first performance metric needs to be improved for a given sub-sector. In step 802, if any affected sub-sector needs an improvement, then the routine is exited in step 803. An affected sub-sector is a neighboring sub-sector for which a second performance metric is degraded below an acceptable level with the improvement of the first performance metric. The antenna is adjusted in an incremental manner by step 804 so all affected sub-sectors are degraded within an acceptable level. In step 804, values for control signals 116, 117, 118, 119, 120, and 121 are calculated and are applied to the apparatus shown in FIG. 5. The routine is exited in step 805. The process in FIG. 6 is repeated for a subsequent study period, and the process in FIG. 8 is re-executed causing a subsequent incremental adjustment if necessary.

Processing, in accordance with the flow diagrams shown in FIGS. 6, 7, and 8 may be implemented at MSC 112, base stations 106, 107, and 108, or distributed across these entities.

It is to be understood that the above-described embodiment is merely an illustrative principle of the invention and that many variations may be devised by those skilled in the art without departing from the scope of the invention. It is, therefore, intended that such variations be included with the scope of the claims.

What is claimed is:

1. A wireless communications system supporting a call with a mobile subscriber unit that is located within a sector of a cell of said wireless communications system, said sector containing a sub-sector, said wireless communications system containing a base station communicating with said mobile subscriber unit through a base station antenna for supporting said call, said wireless communications system comprising:
    means for detecting an occurrence of a call event type associated with said call; means, responsive to said detecting means, for determining an approximate location of said mobile subscriber unit at the occurrence of said call event type;
    means, responsive to said determining means, for mapping said approximate location to said sub-sector of said sector;
    means, responsive to said mapping means, for incrementing a corresponding event counter that is associated with said call event type and said sub-sector; said corresponding event counter determining a performance metric associated with said sub-sector;
    means, responsive to said incrementing means, for accumulating said corresponding event counter during a study period; and
    means, responsive to said accumulating means, for adjusting a radiation pattern of said base station antenna by coupling control signals to said base station in order to provide an improvement of said performance metric determined by said corresponding event counter.

2. The wireless communications system of claim 1, wherein said call is a mobile-originated call.

3. The wireless communications system of claim 1, wherein said call is a mobile-terminated call.

4. The wireless communications system of claim 1, wherein said approximate location of said mobile subscriber unit is a last known location of said mobile subscriber unit if said approximate location of said mobile subscriber unit cannot be ascertained by said determining means.

5. The wireless communications system of claim 1 wherein a second performance metric is associated with a second sub-sector and wherein said adjusting means comprises:
    means for calculating updated values of said control signals to provide said improvement of said performance metric;
    means, responsive to said calculating means, for modifying said updated values in order to limit a degradation of said second performance metric; and
    means, responsive to said modifying means, for adjusting said radiation pattern of said base station antenna with said updated values.

6. The wireless communications system of claim 5, wherein said second sub-sector is located within the cell served by said base station.

7. The wireless communications system of claim 5, wherein said second sub-sector is located within a second cell served by a second base station.

8. The wireless communications system of claim 1 wherein a second performance metric is associated with a second sub-sector and wherein said adjusting means comprises:
    means for assessing whether said second performance metric is degraded more than a predetermined limit;
    means, responsive to said assessing means, for calculating incremental values of said control signals to provide said improvement of said performance metric; and
    means, responsive to said calculating means, for adjusting said radiation pattern of said base station antenna with said incremental values.

9. The wireless communications system of claim 8, wherein said second sub-sector is located within the cell served by said base station.

10. The wireless communications system of claim 8, wherein said second sub-sector is located within a second cell served by a second base station.

11. The wireless communications system of claim 1 wherein said base station antenna comprises a plurality of sub-sectors, each sub-sector associated with a narrow beam radiation pattern.

12. A method for supporting a call for a mobile subscriber unit that is located within a sector of a cell of a wireless communications system, said sector containing a sub-sector, said wireless system containing a base station communicating with said mobile subscriber unit through a base station antenna for supporting said call, said method comprising the steps of:
    detecting an occurrence of a call event type associated with said call;
    determining an approximate location of said mobile subscriber unit at said occurrence of said call event type, responsive to said step of detecting;
    mapping said approximate location to a sub-sector, responsive to said step of determining;
    incrementing a corresponding event counter that is associated with said call event type and said sub-sector responsive to said step of mapping; said corresponding event counter determining a performance metric associated with said sub-sector;
    accumulating said corresponding event counter during a study period responsive to said step of incrementing; and
    adjusting a radiation pattern of said base station antenna by coupling control signals to said base station antenna in order to provide an improvement of said performance metric, responsive to said step of accumulating.

13. The method of claim 12, wherein a second performance metric is associated with a second sub-sector and wherein said step of adjusting comprises:
    calculating updated values of said control signals to provide said improvement of said performance metric;
    modifying said updated values of said control signals in order to limit a degradation of said second performance metric, responsive to said step of calculating; and
    adjusting said radiation pattern of said base station antenna with said updated values, responsive to said step of modifying.

14. The method of claim 12, wherein a second performance metric is associated with a second sub-sector and wherein said step of adjusting comprises:
    determining whether said second performance metric is degraded more than a predetermined limit;
    calculating incremental values of said control signals to provide said improvement of said performance metric, responsive to said step of determining, and
    adjusting said radiation pattern of said antenna with said incremental values, responsive to said step of calculating.

15. A wireless communications system supporting a call with a mobile subscriber unit that is located within a sector of a cell of said wireless communications system, said sector containing a sub-sector, said wireless communications system containing a base station communicating with said mobile subscriber unit through a base station antenna for supporting said call, said wireless communications system comprising:
    means for detecting an occurrence of a call event type associated with said call;
    means, responsive to said detecting means, for determining an approximate location of said mobile subscriber unit at the occurrence of said call event type;
    means, responsive to said determining means, for mapping said approximate location to said sub-sector of said sector,
    means, responsive to said mapping means, for incrementing a corresponding event counter that is associated with said call event type and said sub-sector; said corresponding event counter determining a performance metric associated with said sub-sector;
    means, responsive to said incrementing means, for accumulating said corresponding event counter during a study period; and
    means, responsive to said accumulating means, for adjusting a radiation pattern of said base station antenna by coupling control signals to said base station in order to provide an improvement of said performance metric determined by said corresponding event counter;
    wherein said call event type is selected from the group forward frame error rate and reverse frame error rate.

16. The wireless communications system of claim 15, wherein said group additionally consisting of dropped call and blocked call.

\* \* \* \* \*